United States Patent [19]
Hehl

[11] 3,974,857
[45] Aug. 17, 1976

[54] DEVICE FOR MONITORING AND ADJUSTING THE TEMPERATURE OF MULTIPLE COOLING CIRCUITS

[76] Inventor: Karl Hehl, Arthur-Hehl-Strasse 32, 7291 Lossburg, Germany

[22] Filed: June 27, 1974

[21] Appl. No.: 483,708

[30] Foreign Application Priority Data
July 23, 1973 Germany............................ 2337410

[52] U.S. Cl................................... 137/559; 165/11; 73/209; 137/271; 137/561 R
[51] Int. Cl.²...................... G01F 1/00; G08B 21/00
[58] Field of Search ........... 137/551, 559, 561, 271; 73/209

[56] References Cited
UNITED STATES PATENTS

| | | | |
|---|---|---|---|
| 2,834,368 | 5/1958 | Gray .................................. | 137/271 |
| 3,100,496 | 8/1963 | Reiser .............................. | 73/209 UX |
| 3,133,440 | 5/1964 | Conkling............................. | 73/209 |
| 3,506,029 | 4/1970 | Demler et al. ................. | 137/561 R |
| 3,675,481 | 7/1972 | Phillips ............................. | 73/209 |
| 3,689,908 | 9/1972 | Ray................................... | 73/209 X |

FOREIGN PATENTS OR APPLICATIONS
1,812,883    6/1970    Germany

*Primary Examiner*—Henry T. Klinksiek
*Attorney, Agent, or Firm*—Joseph A. Geiger

[57] ABSTRACT

A device for monitoring and adjusting the temperature of multiple cooling circuits in which a monitoring unit with a float-type flow gauge, a temperature gauge and a throttle valve is associated with each cooling circuit, and several units are assembled in a monitoring bank. A main liquid supply pipe and main liquid outlet pipe support the bank adjustably on the machine for supervision by an operator.

12 Claims, 6 Drawing Figures

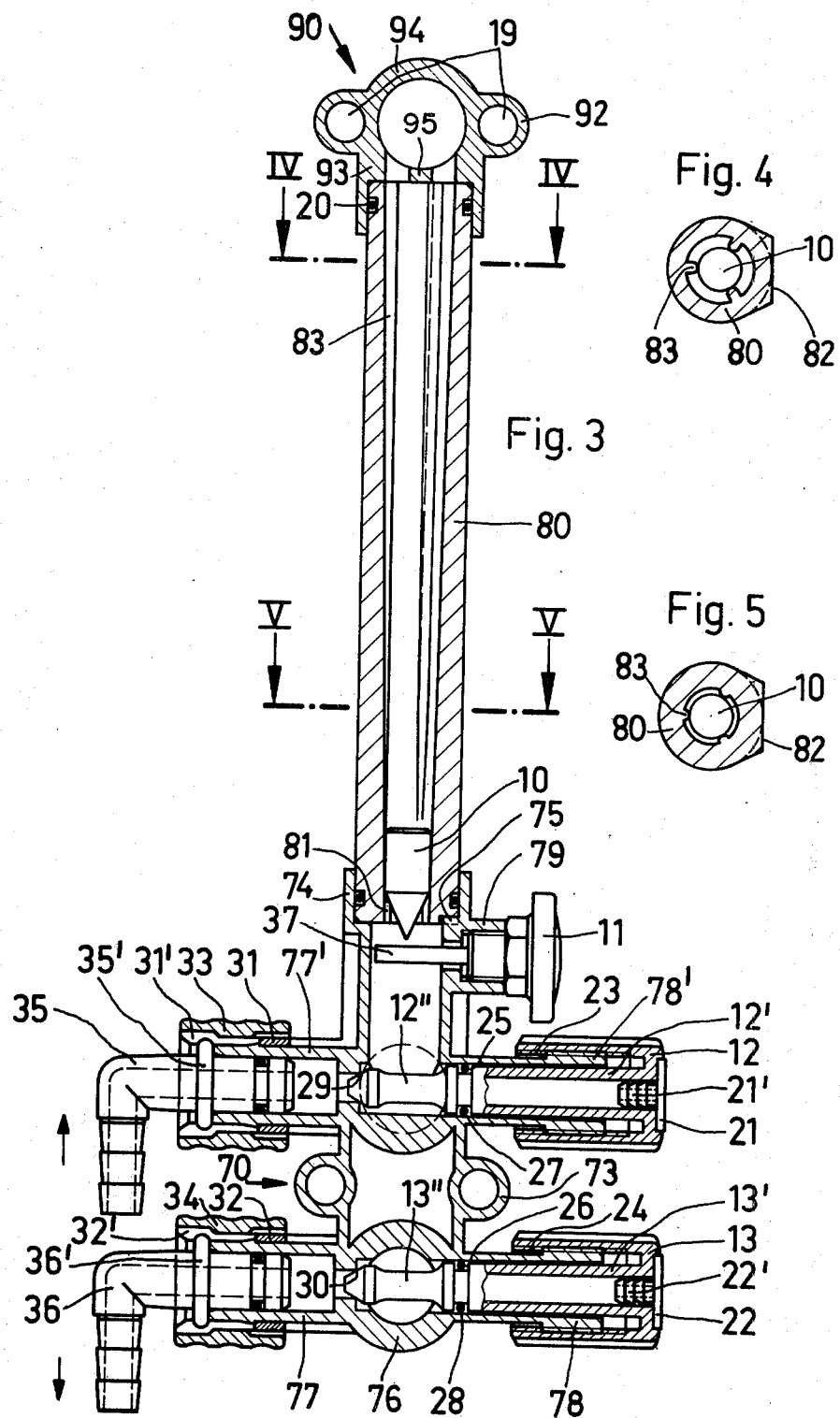

DEVICE FOR MONITORING AND ADJUSTING THE TEMPERATURE OF MULTIPLE COOLING CIRCUITS

BACKGROUND OF THE INVENTION

1. Field of the Invention

The present invention relates to devices for monitoring and adjusting cooling circuit temperatures, and in particular to devices for monitoring and adjusting the temperatures of multiple cooling circuits, as are used in heat-generating production machines, for example injection molding machines.

2. Description of the Prior Art

In the case of an injection molding machine, for example, there are several critical zones in which the temperature must be continuously monitored and maintained within a comparatively narrow range. Among these critical zones are the injection molding die itself, the inlet region of the plastification cylinder, and the hydraulic pressure fluid used in the hydraulic system of the machine. Thus, when for instance the temperature of the injection molding die drops below the empirically determined optimal temperature, the quality of the molded parts suffers and their dimensional accuracy is negatively affected. These dimensional deviations may be the result of residual material stress inside the molded parts, which stress may also reduce the mechanical resistance of the parts. If, on the other hand, the temperature in the critical zone of the injection molding die is above the optimal value, the cycle duration of the machine is markedly longer. This means that valuable time is wasted during each production cycle, the result being a reduction in productive efficiency.

The critical temperature zone in the plastification cylinder of the injection unit is located at the granulate inlet to the plastification screw. If this temperature drops below the optimal value, the plastification output of the plastification cylinder is reduced. A temperature above the optimal value results in material smudging around the granulate intake, and in extreme cases, in jamming at the intake zone.

Lastly, the temperature of the hydraulic pressure medium has to be monitored and maintained at its optimal value, within a comparatively narrow range. This optimal temperature is comprised between approximately 40° and 50° C. If the temperature of the hydraulic oil falls below this range, the pressure medium begins to "knock", thereby reducing the operating efficiency of the machine, while increasing the mechanical stress to which various critical components, e.g. valve components, are subjected. If the hydraulic oil becomes too hot, it tends to reduce the longevity of heat-sensitive sealing elements, such as rubber gaskets and plastic parts, for example.

Other critical temperature zones may be encountered in an injection molding machine at places where considerable heat is generated from mechanical friction.

From prior art in this field is known a device for visually monitoring the flow speed of a liquid medium: German Published Application (Offenlegungsschrift) No. 1,812,883.

In the case of injection molding machines, for example, it has heretofore not been possible to monitor and maintain within a narrow optimal temperature range the above-mentioned critical temperature zones of the machine with means which are both simple in structure and satisfactory in operation.

SUMMARY OF THE INVENTION

It is a primary objective of the present invention to suggest a simple device for monitoring and adjusting the temperature of multiple cooling circuits in a production machine, such as an injection molding machine, in order to maintain constant temperatures in various critical heat-generating zones of the machine which are cooled by means of separate cooling circuits.

The invention proposes to attain the above objective by suggesting a novel device which combines means for visually monitoring the flow speed of the cooling medium in each cooling circuit with means for visually indicating the cooling medium temperature as it returns from the critical temperature zone of the machine.

Since it is in many cases necessary to monitor and adjust a plurality of separate cooling circuits servicing various critical zones of the machine, the invention further suggests a bank of identically structured parallel-aligned cooling circuit monitoring units which are held together by means of transverse clamping rods to form a simple subassembly which is easy to assemble and convenient to supervise and to adjust.

In a particularly advantageous embodiment of the invention, the separate cooling circuits have a common inlet for the arriving cold cooling liquid and a common outlet for the departing hot cooling liquid collected from the various cooling circuit return lines. A preferred monitoring and adjusting unit includes a vertically oriented transparent flow gauge in the form of a tubular cylinder whose inner profile forms an upwardly slightly opening taper so that a float arranged inside the flow gauge is lifted by the upwardly flowing returned liquid to a level which is indicative of its flow speed. Simultaneously, the returning hot liquid, upon entering the monitoring unit, flows past a temperature gauge which gives a continuous temperature reading of the critical machine zone, as reflected by the returning liquid.

In the preferred embodiment of the invention, each cooling circuit monitoring unit further includes a throttle valve by means of which the flow speed of the cooling liquid through each cooling circuit is adjustable, and a shut-off valve by means of which a particular cooling circuit can be set still, without affecting the other cooling circuits of the machine. Obviously, the adjustment of the flow speed of the cooling liquid through a particular cooling circuit affects the temperature of the machine zone which is being cooled, an increase in the flow speed meaning a reduction in temperature, and a decrease permitting a corresponding rise in the temperature.

The visual observability of both the temperature and the flow rate of the cooling medium in each cooling circuit further provides a convenient way of monitoring and comparing the heat output of the various critical temperature zones in the machine, by comparing the combined readings of flow speed and temperature over a certain period of time under otherwise identical or comparable operating conditions. Lastly, the novel cooling circuit monitoring and adjusting units are designed to be manufactured at minimal cost, the component parts of the preferred embodiment being manufacturable virtually without exception as injection molded plastic parts, ready for assembly without any machine operations.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 3 is a longitudinal lateral cross section through the unit of FIG. 2;

FIG. 4 is a transverse cross section through the unit, as taken along line IV-IV of FIG. 3;

FIG. 5 is another transverse cross section taken along the line V—V of FIG. 3.

DESCRIPTION OF THE PREFERRED EMBODIMENT

Figure 1:
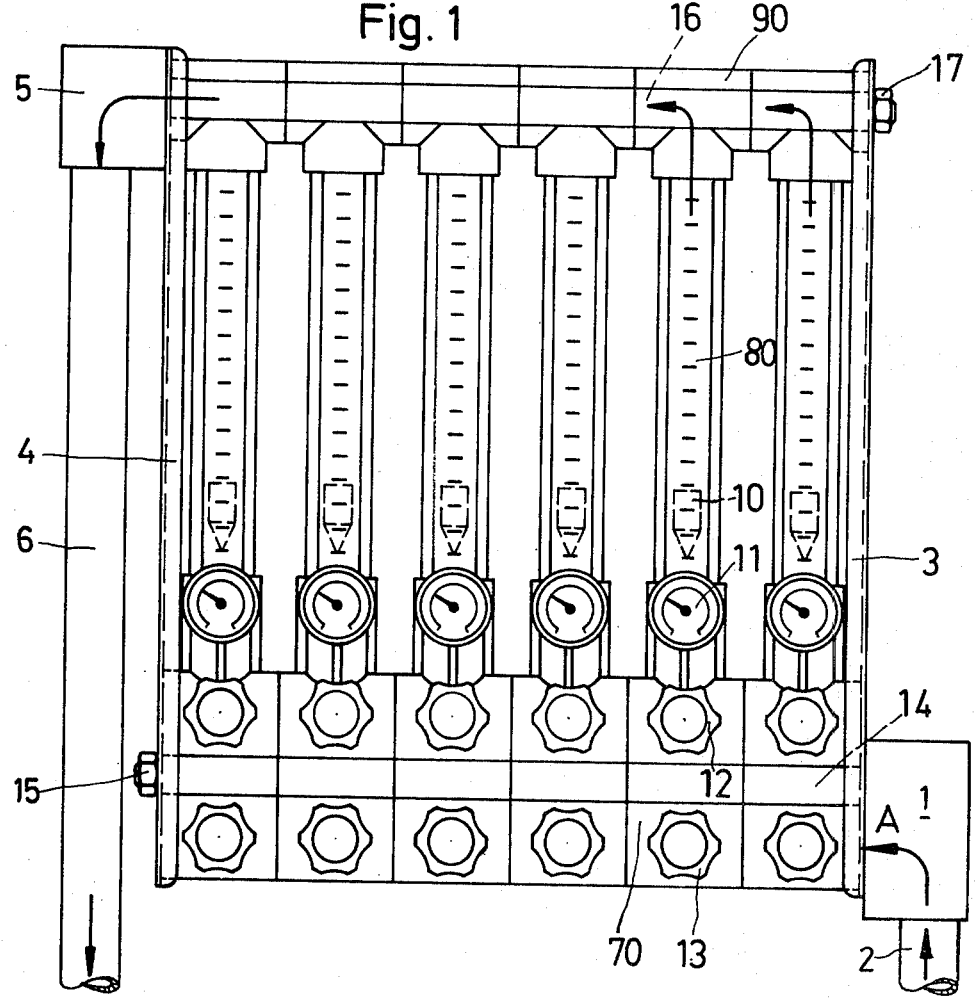
FIG. 1 shows in an elevational view a bank of six cooling circuit monitoring and adjusting units, representing an embodiment of the invention.

In FIGS. 1–6 of the drawing is illustrated a preferred embodiment of a device serving to visually indicate the flow speed of a cooling medium through a number of separate cooling circuits, combined with means for reading the temperature of the returning hot cooling medium as an indication of the temperature existing at various critical temperature zones on a production machine, which may be an injection molding machine, for example.

The representation of FIG. 1 illustrates a bank of six individual cooling circuit monitoring units arranged vertically in parallel and laterally communicating with each other. The enlarged representation of FIGS. 2–5 shows one of the cooling circuit monitoring units in greater detail.

Figure 2:
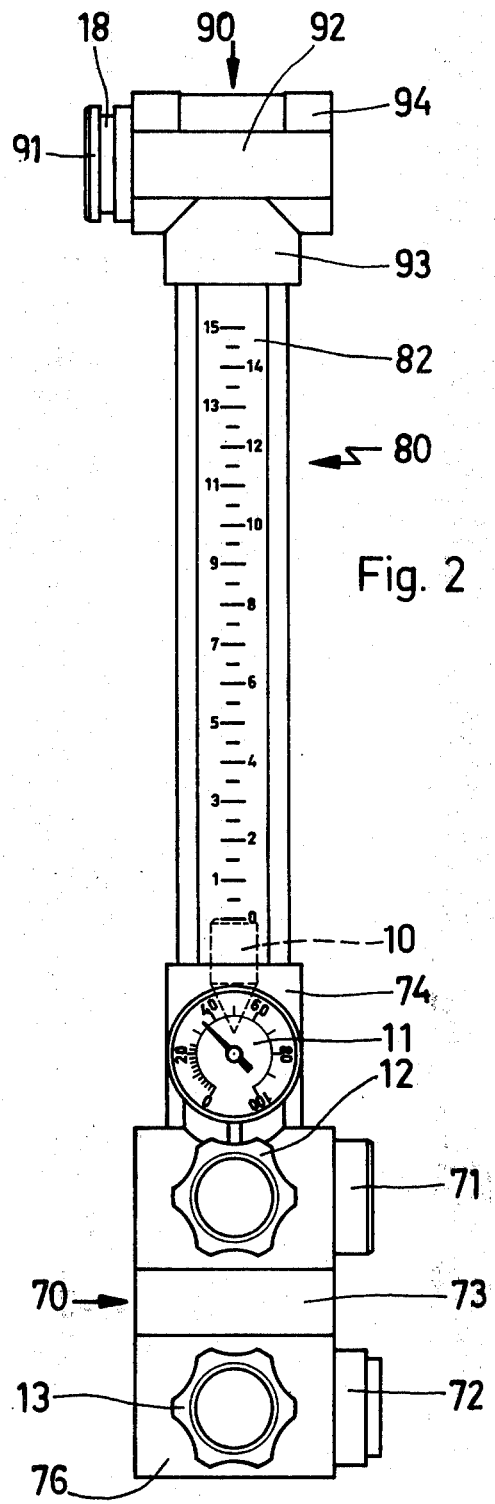
FIG. 2 shows a single unit from the bank of FIG. 1 in an enlarged, more detailed representation.

As can be seen in FIGS. 2 and 3, each unit has three connections on its lower portion and one connection on its top. The two rear connectors 35 and 36 lead to a machine cooling circuit (not shown), cold cooling liquid leaving the unit through connector 36 and hot cooling liquid returning through connector 35. A transverse connection 76 at the bottom of each unit communicates with the adjacent units and with the common cold liquid inlet 1, 2 for all units. A similar connection at the top of the units communicates transversely through all units with a common hot liquid outlet 5, 6.

The bottom portion of each unit is formed by a complex injection molded distributor manifold 70, carrying on its upper end a vertical flow gauge cylinder 80 which in turn carries a head 90 in the form of a T-connector. Both the distributor manifold 70 and the head 90 are arranged to be directly connected to identical distributor manifolds and heads engaging them from both sides. A bank composed of any desirable number of monitoring units can thus be assembled by simply clamping the units together, as shown in FIG. 1.

The distributor manifold 70 has a number of horizontal and vertical extensions and openings, all formed in a single injection molding operation: at 71 (FIG. 2) is shown a centering extension which cooperates with a matching recess in the opposite side of the manifold 70 of an adjacent unit. At 72 is shown an outwardly similar, but hollow connecting extension, the extension 72 engaging a transverse throughbore in the distributor manifold of the adjacent unit. Thus, while extension 71 serves only a centering purpose, extension 72 establishes a transverse flow channel between adjacent monitoring units. At 73 (FIG. 3) are shown two transverse ears for the insertion of clamping rods across adjacent monitoring units, thereby combining the units into a bank-type assembly. On the upper end of the distributor manifold 70 is a seating sleeve 74 which is engaged by the bottom portion of the gauge cylinder 80, a positioning nose 75 determining the angular position of the gauge cylinder with respect to the distributor manifold 70. The tubular portion 76 at the bottom of the distributor manifold has horizontally aligned front and rear extensions: a connecting extension 77 extending to the rear and a valve extension 78 on the front. At the level of the earlier-mentioned centering extension 71 are provided similar rear and front extensions, viz. a rear connecting extension 77' and a front valve extension 78'. Lastly, just under the seating sleeve 74 and above the upper valve extension 78' is arranged a third forward extension or socket 79 for the accommodation of a temperature gauge 11.

The two forwardly oriented valve extensions 78 and 78' accommodate structurally identical valve elements 12 and 13, respectively. The valve element 12 is again a single injection-molded part consisting of a knob-shaped body with a female thread engaging a male thread on the valve extension 78' and a central plunger extension 12' reaching rearwardly through the center portion of the distributor manifold to a valve seat 29 which is located in the junction between the connecting extension 77' and a vertical bore leading to the seating sleeve 74 for the gauge cylinder 80. The plunger extension 12' has a thinned neck portion between its head and an O-ring 27, in order to facilitate the flow of liquid around it. On its front face, the valve element 12 further carries an identification plug 21 which is engaged in a bore of the plunger extension 12' by means of a serrated shaft 21'. The valve element 12 thus serves as a throttle valve against its seat 29, controlling the flow speed of the returning hot cooling liquid arriving through rear connector 35 and passing upwardly through the gauge cylinder 80 and its head 90 to the common cooling liquid outlet 5.

An identical valve element 13 is arranged in the lower valve extension 78. This valve, however, though usable as a second throttle valve, serves primarily as a shutoff valve for the case in which a particular cooling circuit is to be disconnected. Thus, by closing both valves, a monitoring unit can be completely shut down and disconnected from the overall cooling circuit, without any impediment to the latter, as the main incoming and outgoing liquid streams then simply pass through the bottom and top of the disconnected unit.

The upper and lower rear extensions 77 and 77' are likewise identical in structure and carry identical swivel connectors 35 and 36 for the attachment of flexible hoses (not shown) which lead to the various critical temperature zones of the machine. The two rear swivel connectors 35 and 36 are elbow connectors, engaging matching bores inside the connecting extensions 77 and 77'. Each connector has an upstanding, rounded locking collar 35' or 36', respectively, the collars being engaged by cooperating locking sockets 31 and 32 which have a number of axially extending slits defining between them radially flexing locking fingers 31' and 32', the fingers having a common radial groove which cooperates with the locking collars 35' and 36' of the swivel connectors. Each locking socket is seated on the outside of its connecting extension and held in place by a snap connection. The sockets in turn are surrounded by locking sleeves 33 or 34, respectively. This locking sleeve, when engaged over the locking socket, restrains the latter radially, thereby retaining the swivel connector against the connecting extension. But when the locking sleeve is withdrawn from the swivel connector, it frees the fingers of the locking socket so that the swivel connector can be snapped in or out of its connecting extension without effort. This quick-release connection, in cooperation with the earlier-described valves, permits quick and foolproof connection and disconnection of any one of the cooling circuits.

The third forward extension 79 of the distributor manifold 70 carries a temperature gauge 11. This gauge has a sensing extension 37 consisting, for example, of a bimetalic temperature sensor. This temperature sensor 37 is arranged just below the lower end of the gauge cylinder 80, seated in the seating sleeve 74 of the distributor manifold 70. The hot cooling liquid returning from a cooling circuit thus enters through the upper swivel connector 35, flowing past seat 29 of the throttle valve 12 and past the temperature sensor 37 into the gauge cylinder 80. The latter is a transparent hollow cylinder, likewise injection molded. It has a notch at its bottom end engaging the earlier-mentioned positioning nose 75 inside the seating sleeve 74 so as to determine the orientation of the graduated face 82 (FIG. 2) on the front of the gauge cylinder 80. Between the seat of sleeve 74 and the engaged portion of cylinder 80 is arranged an O-ring gasket. The hollow interior of gauge cylinder 80 is a profile of gradually increasing cross section, widening in a slight taper toward the upper end of the gauge cylinder. Two cross sections of this profile are illustrated in FIGS. 4 and 5. Inside this inner flow profile is arranged a vertically movable metallic float 10, the float having a generally cylindrical outline and a tapered nose portion facilitating the upward flow of liquid past the float. The inner flow profile of gauge cylinder 80 further includes three circumferentially spaced guide ribs 83 between which the float 10 is guided as it moves vertically in response to changes in the flow speed of the returning cooling liquid. The bottom ends of the guide ribs 83 are narrowed inwardly to form abutments 81 at the bottom end of the gauge cylinder, in order to prevent the float from dropping onto the temperature sensor 37 in the absence of liquid flow. A vertical graduation 82 on the front face of the gauge cylinder permits a convenient reading of the position of the float from a distance.

The vertical position of float 10 is determined by the flow speed, i.e. the rate of cooling liquid flowing through the gauge cylinder 80. Thus, a specific speed of liquid flow at the float 10 will be necessary to overcome the gravity effect of the latter and to establish a floating equilibrium. The maintenance of this specific flow speed requires a certain flow section inside the gauge cylinder at a given rate of liquid flow. Therefore, if the throttle valve 12 is opened so as to increase the flow rate, the speed of the liquid flowing past float 10 increases initially, thereby exerting a greater lifting force on the float, the latter moving upwardly to a level of larger cross section, until the earlier-mentioned equilibrium flow speed is reestablished. The vertical equilibrium position of float 10 thus represents a measure of the liquid flow rate in the cooling circuit, as established by throttle valve 12.

The upper end of the gauge cylinder 80 is connected to a heat 90 which includes a downwardly extending seating portion 93 receiving the upper end portion of cylinder 80. The latter includes an O-ring forming a seal between it and seat 93. Again, the head is a single injection molded part, having a transverse connecting extension 91 (FIG. 2) oriented in the opposite direction of the connecting extension 72 at the bottom of the unit. This head extension 91 cooperates with a matching recess on the other side of the adjoining monitoring unit, the head having a transverse throughbore establishing a continuous outlet conduit for the hot cooling liquid. An annular groove 18 in the connecting extension 91 is designed to accommodate another O-ring. The head 90 further includes two mounting ears 92, similar to the mounting ears 73 of the distributor manifold 70, the bores 19 inside the ears 92 accommodating two upper clamping rods 16 holding the monitoring units together. The conduit junction between the upper outlet of the gauge cylinder 80 and the transverse throughbore of head 90 includes a central abutment bridge 95 restraining the float 10 from entering the head 90, if a sudden flow surge should lift it that high.

As can be seen in FIG. 1, a number of identical cooling circuit monitoring units are combined in parallel vertical alignment to one another to form a monitoring bank. Upper and lower clamping rods 16 and 14, respectively, with nuts 17 and 15 hold the monitoring units together. The lateral extremities of the monitoring bank are covered by two special covers. The head cover 3 covers the outermost opening 94 of the first head 90, and the manifold cover 4 covers the end opening of the manifold portion 76. These covers are held by the nuts 15 and 17 on the one hand, and by the inlet connecting flange 1 and outlet connecting flange 5, on the other hand. The latter also support the entire bank. In this arrangement, the lowermost tubular portions 76 of the combined monitoring units form a continuous intake conduit, in the manner of an intake manifold, the cold cooling liquid being supplied to this intake conduit through the inlet 1 and the supply pipe 2, the arrow A indicating the flow direction. As can be seen in FIG. 3, the several lower rear connectors 36 communicate with the intake conduit via the shutoff valves 13.

The hot cooling liquid of each cooling circuit returns to the monitoring units through the upper rear connector 35, and via the throttle valve 12, flowing upwardly through the gauge cylinder 80 and out through the heads 90 which, like the tubular portions 76 at the lower ends of the monitoring units, form a continuous outlet conduit leading to a common outlet flange 5 and to a vertical return pipe 6. The arrows in FIG. 1 indicate the flow direction. The hot cooling liquid returning from the various cooling circuits flows through return pipe 6 to a central cooling unit (not shown) from where cold cooling liquid is again supplied to the various circuits through the vertical supply pipe 2 and the inlet connecting flange 1.

As has been mentioned further above, each cooling circuit can be disconnected, without affecting the flow of cooling liquid through the cooling circuit monitoring bank and through the other cooling circuits. This is accomplished by simply closing one or both valves of the monitoring unit, the rear connectors 35 and 36 being removable when both valves 12 and 13 are closed. Thus, cooling circuits can be added or removed from the cooling circuit monitoring bank, without any need for modifying or disassembling the latter.

The cooling circuit monitoring bank unit of the invention makes it possible to continuously and conveniently supervise and adjust the temperature in each of a number of separate cooling circuits, thereby maintaining a predetermined optimal temperature at each of several critical temperature zones of the production machine, where separate cooling circuits are provided. THe machine operator now has the possibility of visually verifying both the temperature of the returning hot cooling liquid of each cooling circuit and of comparing it with the flow rate in each circuit. The temperatures are readable from the temperature gauges 11, while the flow rates are reflected by the height to which the floats 10 are lifted by the returning liquids. The machine operator, therefore, only needs to have a simple table listing either the desired optimal temperatures, or the necessary flow rates, or preferably both. The optimal temperature values for the critical zones of the machine may have been determined empirically, i.e. through trial and error, or they may be the result of theoretically determined requirements. Whenever the temperature in a particular cooling circuit exceeds the optimal temperature determined for the particular critical machine zone, for example when a higher temperature of cooling liquid returning from the injection molding die indicates a heat buildup in that part of the machine, the operator simply opens the corresponding throttle valve 12, thereby increasing the flow rate in that cooling circuit. The injection molding die will now be cooled more effectively, its temperature dropping to the desired optimal temperature.

Normally, there is a certain correlation observable between the temperature measured in the returning cooling liquid streams and the flow rate of liquid. Thus, an experienced operator may be able to anticipate that for a given increase in the liquid flow rate adjusted at the throttle valve, he will obtain a given decrease of the cooling liquid temperature. Obviously, this relationship between temperature and liquid flow rate depends upon the specific operating conditions of the machine, and it may change with different operating speeds and with different raw materials used in the machine, for example.

On the other hand, the invention affords a convenient way of verifying the operational conditions in the various critical temperature zones of the machine to the extent that, for example, a progressively increasing heat buildup in a particular machine part due to operational irregularities is easily ascertainable by the operator, by comparing past ratios of temperatures and flow rates of the various cooling circuits with present readings. The opeator thus has the possibility not only of maintaining optimal temperatures in the various cooling circuits, he can also establish to what extent the maintenance of these constant temperatures requires different flow rates at different points in time. For instance, changes in the ambient temperature around the production machine can be immediately compensated for, once the operator has learned to what extent they affect the relationship between temperature and flow rate in the cooling circuits. The inventor has found that the use of this novel cooling circuit monitoring unit greatly improves the operational flexiblity of an injection molding machine, while the requirements of skill and experience on the part of the machine operator are actually reduced.

Lastly, the novel cooling circuit monitoring and adjusting device is particularly suitable for the keeping of written records of machine operating conditions for a particular machine setup, which conditions can then be quickly reproduced at a later time, when the same setup is to be re-established on the machine. Thus, when a written record is kept for given combinations of injection molding dies and raw materials, it suffices to re-adjust the recorded values, when the same tools and materials are used again, thereby eliminating the need for lengthy trial and error adjustments.

The known prior art device for visually verifying the flow speed in a cooling circuit, as disclosed in the German Offenlegungsschrift No. 1,812,883, does not by itself permit the verification of the temperature and flow speed relationship which takes into consideration the aforementioned changes in ambient temperature as well as changes which are due to different raw materials and different machine configurations used. In many cases, for example, cooling systems of production machines are adjusted for an excessive use of water, because the quantity of water used is frequently deliberately set above rather than below the optimal amount, in order to have a certain degree of operational safety. Depending upon the geographical location and the number of production machines in use in a particular facility, such excessive use of cooling water may mean waste of a precious and expensive raw material, and the result may be an avoidable cost factor in the economics of the facility. This consideration is particularly relevant in connection with the cooling circuit associated with the hydraulic fluid reservoir of an injection molding machine, where a considerable quantity of hydraulic fluid has to be maintained at a given temperature. In view of the volume of hydraulic fluid normally required for machines for this type, even a rather slight under-cooling of the hydraulic fluid may mean a quite considerable increase in the requirements of cooling liquid.

Figure 6:
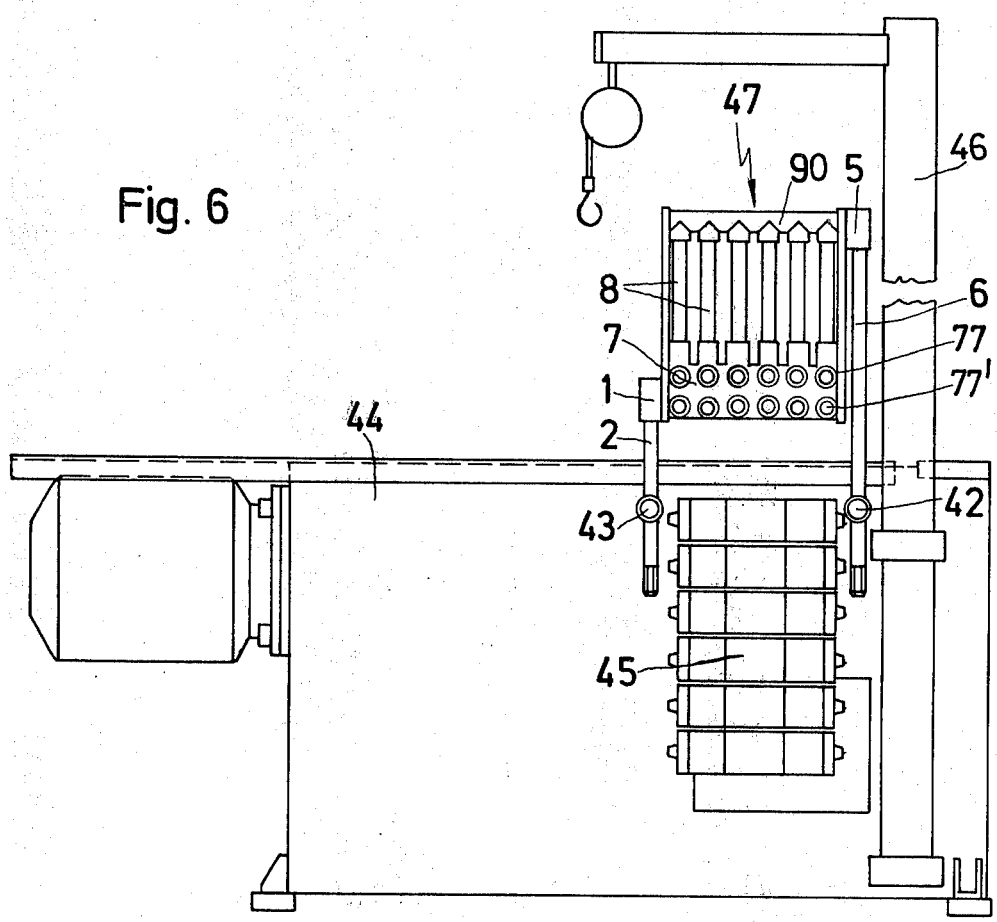
FIG. 6 illustrates, somewhat schematically, the arrangement of the device of FIG. 1 when mounted on an injection molding machine.

In the overall arrangement of an injection molding machine, as illustrated in FIG. 6, the cooling circuuit monitoring bank is shown to be arranged above the upper level of the machine frame 44, in vertical alignment with a cluster of hydraulic distributor valves 45. The vertical supply pipe 3 and the return pipe 6, and their associated inlet and outlet connecting flanges 1 and 5 serve as the sole mounting supports for the entire monitoring bank 47. (FIG. 6 shows the assembly of FIG. 1 seen from the reverse side.) The entire unit 47 is also adjustable in its height in relation to the machine base 44. This is made possible by a clamping connection between the vertical pipes 2 and 6 at two horizontally extending carrying arms 43 and 42, respectively, the latter flanking the distributor cluster 45 from both sides. A distributor cluster of the type shown in FIG. 6 is disclosed in my co-pending application Ser. No. 473,690, filed May 28, 1974.

Both the monitoring bank 47 and the distributor valve cluster 45 are arranged on the rear side of the machine adjacent to a lifting device with a service hoist attached to a swivel column 46. The gauge cylinders 80 and the temperature gauges 11 of the monitoring bank 47 are preferably arranged at or near eye level of the machine operator, the valve knobs 12 and 13 of each unit being reachable across the machine base. As can also be seen from FIG. 6, the various flexible hoses leading to and from the rear connectors of the cooling circuit monitoring units (the connectors themselves are removed in FIG. 6) are easily accessible for servicing and replacement, because they are on the outside of the machine.

It should be understood, of course, that the foregoing disclosure describes only a preferred embodiment of the invention and that it is intended to cover all changes and modifications of this example of the invention which fall within the scope of the appended claims.

I claim:

1. A device for selectively monitoring and adjusting the temperatures of a number of heat-generating components of a production machine in conjunction with separate cooling circuits for said components, in each of which a cooling liquid flows through a cold liquid supply line to the machine component, removes heat from the latter, and returns through a hot liquid return line, the device comprising in combination:

a plurality of vertically oriented cooling circuit monitoring units arranged laterally adjacent to each other in a row, so as to form a monitoring bank, each unit including:

a distributor manifold at its bottom end having a transverse conduit ending in opposite lateral connections adapted for joining to the manifolds of adjacent units so as to form a continuous inlet conduit therethrough, the manifold further including a first circuit connector linking said conduit to the cold liquid supply line of a cooling circuit, a seating sleeve at the upper end of the manifold, and a second circuit connector extending the hot liquid return line to the inside of said seating sleeve;

a vertically oriented float-type flow gauge connected by its lower end to the seating sleeve of the manifold, the flow gauge having a calibrated gradually widening inner profile through which the returning hot liquid flows upwardly past a float which is verticcally movable therein, the height to which the float is lifted being visuallly ascertainable as an indication of the rate at which the liquid circulates in the cooling circuit;

a head at the top end of the unit having likewise a transverse conduit ending in opposite lateral connections adapted for joining to the heads of adjacent units so as to form a continuous outlet conduit therethrough, the head further including a seating portion to which the upper end of the flow gauge is connected in such a way that it communicates with said outlet conduit;

a temperature gauge arranged in the hot liquid return line ahead of said seating sleeve and indicating the temperature of the returning hot liquid; and valve means associated with at least one of said circuit connectors for adjusting the speed at which cooling liquid flows through the cooling circuit monitoring unit; and wherein the first monitoring unit on one end of the monitoring bank includes on its head a head cover member closing the outlet conduit at that end of the bank, and on its manifold an inlet connecting flange communicating with the inlet conduit of the distributor manifolds; and the last monitoring unit on the other end of the monitoring bank includes on its head an outlet connecting flange communicating with the outlet conduit, and on its manifold a manifold cover member closing the inlet conduit at that end of the bank; the device further comprising:

means for longitudinally clamping together the units, their cover members and connecting flanges; and an inlet line supplying cold cooling liquid to the bank, while an outlet line removes the hot liquid from the bank.

2. A mutli-circuit temperature monitoring device as defined in claim 1, wherein:

each distributor manifold is an injection molded plastic part;

the opposite lateral connections of each manifold are in the form of an integral lateral extension on one side of the manifold and a matching recess on the other side;

the first and second circuit connectors of each manifold include, respectively, a rearwardly oriented lower and upper integral manifold extension, the lower rear extension being located approximately at the level of said inlet conduit and communicating therewith; and the seating sleeve of each manifold is an integral vertical extension thereof and is located above said upper rear extension with which it communicates and with which it forms a length portion of the hot liquid return line.

3. A multi-circuit temperature monitoring device as defined in claim 2 wherein the flow rate adjusting means includes a throttle valve in each distributor manifold, the valve including an axially displaceable valve plunger extending into the manifold in such a way that it cooperates with a valve seat arranged in either said upper rear extension or said lower rear extension for the first and second circuit connectors, so that axial adjustment of the valve plunger toward or away from said seat results in a corresponding decrease or increase in the flow rate inside the cooling circuit.

4. A multi-circuit temperature monitoring device as defined in claim 2, wherein:

each distributor manifold further includes a hollow upper and lower forward extension in horizontal alignment with said upper and lower rear extensions;

the flow rate adjusting means includes two valves mounted in each distributor manifold, the valves including axially displaceable valve plungers extending horizontally through said forward extensions and into the manifold in such a way that they cooperate with valve seats arranged in said upper and lower rear extensions, each valve being thus adapted to serve as a throttle valve and/or as a shutoff valve.

5. A multi-circuit temperature monitoring device as defined in claim 4, wherein:

each distributor manifold further includes a male thread on its forward extensions;

each of the valves includes a hollow adjustment knob with a female thread engaging said extension male thread; and the valve plungers are integrally connected to said adustment knobs.

6. A multi-circuit temperature monitoring device as defined in claim 1, wherein:

each distributor manifold further includes on its front side a socket for the mounting of the temperature gauge, the socket having a bore communicating with that portion of the hot liquid return line which is located between the seating sleeve and the second circuit connector;

the temperature gauge includes a temperature sensor reaching through said socket bore into the hot liquid return flow.

7. A multi-circuit temperature monitoring device as defined in claim 1, wherein:
each flow gauge includes a transparent gauge cylinder with a vertical graduation scale on its front;
the lower end of the cylinder is seated in the seating sleeve of the distributor manifold and its upper and similarly engages the seating portion of the head;
the inner profile of the flow gauge is a slightly tapered, upwardly widening bore extending through the gauge cylinder;
the float is elongated and substantially cylindrical; and
said inner profile further includes at least three circumferentially spaced inwardly projecting guide ribs defining a vertical guide for the float.

8. A multi-circuit temperature monitoring device as defined in claim 7, wherein:
the inner profile of each gauge cylinder includes an abutment nose near its bottom end for limiting the downward motion of the float; and
the seating portion of each head includes an abutment bridge reaching across the inner profile at the upper end of the gauge cylinder for limiting the upward motion of the float.

9. A multi-circuit temperature monitoring device as defined in claim 1, wherein
the first and second circuit connectors of each distributor manifold are elbow-type swivel connectors attached to the manifold by means of finger-operable quick-release connections.

10. A multi-circuit temperature monitoring device as defined in claim 9, wherein
each of said quick-release connections includes:
a cylindrical bore in the connecting extension of the manifold;
a matching cylindrical portion and a locking collar on the swivel connector;
a tubular locking socket surrounding the connecting extension so as to be axially movable relative thereto and having a plurality of radially flexible locking fingers with a common groove which is engageable over the locking collar;
an axially moable locking sleeve surrounding and cooperating with the locking socket in such a way that in one sleeve position the locking fingers are radially confined in engagement with the locking collar and, in another sleeve position, the fingers are free to flex outwardly and to release the swivel connector.

11. A multi-circuit temperature monitoring device as defined in claim 1, wherein:
the longitudinal clamping means includes:
at least one clamping ear on each distributor unit, with a horizontal transverse bore therethrough arranged in alignment with the transverse bores of adjacent units;
at least one similar clamping ear on each head with similarly aligned throughbores;
a lower clamping rod reaching through the manifold cover member and through the clamping ears of the manifolds into the inlet connecting flange; and
an upper clamping rod reaching through the head cover member and through the clamping ears of the heads into the outlet connecting flange.

12. A multi-circuit temperature monitoring device as defined in claim 11, wherein:
the inlet line and the outlet line are both vertically oriented rigid pipes extending downwardly from their associated inlet and outlet connecting flanges, respectively;
the monitoring bank is vertically positioned and supported by said pipes; and
the device further includes pipe clamping means associated with the production machine for adjusting the vertical position of the monitoring bank in relation to said machine.

* * * * *